March 20, 1945.   W. A. SCHULZE ET AL   2,371,849
PROCESS FOR THE POLYMERIZATION OF DIOLEFINS
Filed Jan. 24, 1942
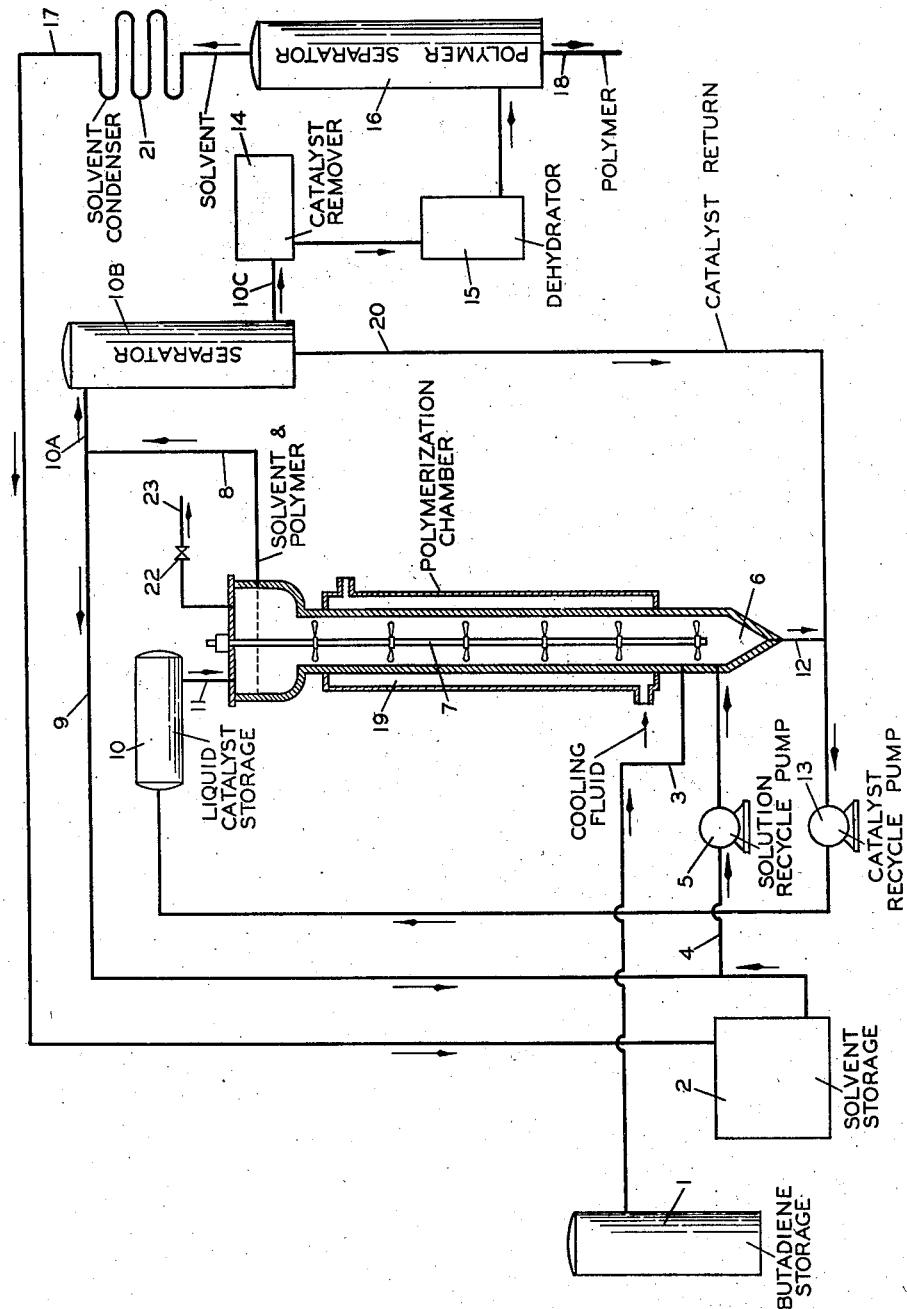
INVENTORS
WALTER A. SCHULZE
WILLIAM N. AXE
BY
ATTORNEY Patented Mar. 20, 1945

2,371,849

UNITED STATES PATENT OFFICE 2,371,849

PROCESS FOR THE POLYMERIZATION OF DIOLEFINS

Walter A. Schulze and William N. Axe, Bartlesville, Okla., assignors to Phillips Petroleum Company, a corporation of Delaware Application January 24, 1942, Serial No. 428,122

16 Claims. (Cl. 260—93)

The present invention relates to a new process for the production of polymers from butadiene and similar aliphatic conjugated diolefins and refers more particularly to the preparation of elastic, adhesive, and oily products through catalytic polymerization of butadiene.

To those skilled in the art it is well known that many factors enter into the production of useful polymers other than the selection of original raw material. Chief among these factors are: rate of polymerization, temperature, pressure, solvents, and catalyst. The aforesaid conditions are closely interrelated, with the nature of the catalyst probably exerting the most profound influence on the reaction. In the past where diolefin hydrocarbons have been concerned and more particularly in the case of butadiene, emphasis has been placed on polymerization catalysts of an alkaline nature. For the polymerization of olefin hydrocarbons, various halogen-containing catalysts of an acidic nature have been proposed such as aluminum chloride and other compounds of the so-called Friedel-Crafts type, and boron trifluoride. However, these latter catalysts have been variously described as requiring the presence of a promoter, such as traces of water, halogen acids, metals or metallic halides. In general, these halide catalysts have been unsatisfactory in the production of useful polymers from butadiene alone. A specific example is the undesirable powder-like polymer derived from butadiene under the catalytic influence of aluminum chloride.

The principal object of the present invention is to provide an improved method for the production of valuable polymers from butadiene-type diolefins using a series of novel catalytic agents. The nature of the catalysts combined with the procedure for bringing about the reactions results in a process for the production of aliphatic conjugated diolefin polymers, which is not only an improvement over prior processes, but also substantially different from any heretofore described.

Numerous other objects will hereinafter appear.

The accompanying drawing portrays diagrammatically one form of apparatus which has been found particularly suitable for carrying out the process of the present invention in a continuous manner.

The polymerization catalysts employed in accordance with this invention comprise the organic addition or complex compounds formed in reactions of boron fluoride with aliphatic monohydric alcohols. The main reaction involved in the absorption of boron fluoride by aliphatic alcohols probably follows the indicated equation:

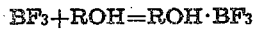

Reaction in certain instances may be complete with the absorption of one mol of boron fluoride per mol of alcohol so that further amounts of boron fluoride are neither absorbed nor retained. In other instances, dependent on the temperature of reaction and the nature of the alcohol, compounds containing two mols of alcohol per mol of boron fluoride may be formed. With alcohols containing four or more carbon atoms and more especially with secondary and/or tertiary alcohols, complex side reactions may take place and produce hydrocarbon-like oils along with the addition compounds. However, once prepared, these addition compounds are stable at moderate temperatures and may be stored for comparatively long periods of time without diminution of catalytic activity.

We have discovered that the polymerization of butadiene-type diolefins can be accomplished at moderate temperatures and pressures in the presence of a catalyst consisting of an addition compound produced by the action of boron fluoride on an aliphatic alcohol and more particularly compounds of boron fluoride with primary aliphatic alcohols. Furthermore, we have discovered that the rate of reaction and the nature of the resultant polymer can be controlled by maintaining the diolefin concentration in the reaction zone at a low level through the use of a substantially saturated or paraffinic diluent such as pentane, which is substantially inert under the conditions of polymerization. The process can be carried out as a batch or continuous operation with the latter being preferred in many instances.

In accordance with the present invention, an aliphatic conjugated diolefin of the butadiene type (i. e. butadiene or its homologues, such as, for example, isoprene, piperylenes, etc., or substitution products of butadiene or its homologues), and preferably butadiene itself, is polymerized by means of a polymerization catalyst consisting of a liquid addition compound of boron fluoride and an aliphatic monohydric alcohol, at a temperature ranging from about 30° F. to about 120° F., and preferably from about 30° F. to about 100° F., at substantially atmospheric pressure, and in the presence of a large volume of an inert diluent which is preferably a solvent for the butadiene, preferably a solvent for at least the lower liquid polymers of butadiene, and preferably immiscible with the catalyst. Immiscibility of the solvent or diluent with the liquid catalyst is advantageous because it permits ready separation of catalyst and diluent or polymer solution after reaction, either in a separating zone apart from the reaction zone or in the said reaction zone itself. This separation may conveniently be effected by allowing layer formation under the influence of gravity or by centrifuging, the liquid catalyst being the heavier. The advantage of this ease of separation due to immiscibility outweighs the advantage of more intimate contact which would be obtained were the diluent a mutual solvent for both the catalyst and the butadiene. Moreover sufficiently intimate contact for rapid polymerization may be economically and readily obtained by agitating the two immiscible phases in any suitable manner as for example by stirring, by passing through a centrifugal mixing pump, or other contactor.

Another essential feature of our invention is that the concentration of unreacted butadiene, or other diolefin, is maintained throughout the reaction zone and period at a low figure, namely below about 10 volume per cent of the solution or diluent phase, and preferably below about 2 volume per cent down to say about 0.5 volume per cent or lower. This may be effected by using a sufficient volume of inert diluent or solvent, or by introducing the gaseous butadiene into the reaction zone, at a sufficiently low rate and maintaining sufficiently rapid conditions of reaction that, at the rate of introduction of butadiene, these limits are not exceeded. Preferably both of these measures are used.

In a preferred mode of operation, which is continuous, two endless circuits of flowing immiscible liquids are established which overlap to form the polymerization zone in which these liquids flow countercurrently and are very intimately contacted. One of these liquids consists of the liquid catalyst and the other consists of the inert diluent or solvent in which is dissolved the butadiene and the soluble polymers thereof and in which is suspended any insoluble polymer. The reaction zone is preferably sufficiently elongated, and there is sufficiently intimate and extended contact therein, that the solvent or diluent issuing therefrom contains substantially no unreacted butadiene. In addition conditions are such that the concentration of unreacted butadiene at no point in the reaction zone attains the limits set forth above. In practice, if the concentration of butadiene is kept below these limits at the beginning of the reaction zone, it will necessarily be below these limits in the rest of the reaction zone.

Preferably the oppositely travelling immiscible liquids are vigorously agitated throughout the major portion of the reaction zone for intimate contact and rapid reaction. Settling zones in which there is little or no agitation and therefore quiescent opportunity for layer separation, may be advantageously provided at both ends of the reaction zone. Under some circumstances the reaction zone may be packed with suitable packing material designed to give intimate contact. Preferably the reaction zone takes the form of a vertical column equipped with a vertical agitator intermediate its ends and in which catalyst descends and diluent and butadiene ascend in countercurrent relationship. The catalyst is removed at the bottom and returned to the top while the solution and/or suspension of polymer is removed at the top. Any suspended polymer may be removed and the solution or diluent returned to the bottom of the column. Equilibrium is soon established at the desired economical concentration of polymer in the diluent, whereupon a portion of the solution is withdrawn from the polymer solution circuit and treated in any suitable manner to recover the polymer and solvent or diluent separately therefrom. If desired, though less preferably, the entire diluent or solvent, containing the polymer in solution and/or suspension therein, leaving the top of the reaction column may be treated to recover all of the polymer therein and the so recovered polymer-free solvent or diluent recycled to the bottom of the column.

The diolefin may be introduced either in gaseous or liquid form, or in the form of a solution in either the fresh or the recycled solvent or diluent, directly into the bottom of the column at a suitable rate. Such a solution may be formed just prior to the point of entry into the bottom of the column.

While it is difficult to fix specific limits for the relative proportions of catalyst, diluent, butadiene and polymer in the reaction zone, the discussion herein will enable those skilled in the art to readily practice the invention without such limits, since the fixing of the other essential operating condition in the manner disclosed herein will automatically determine said relative proportions. However it may be stated that in batch operation the amount of inert solvent or diluent may be as high as about 50 times by weight that of the catalyst. However more catalyst than this may be employed. In a continuous process such as described above, the amount of catalyst may range as high as an amount equal to that of the diluent.

When polymerizing butadiene in accordance with the present invention, we prefer to use a temperature ranging from about 30° to about 120° F. or substantially atmospheric temperature. Temperatures of from about 80° F. to about 100° F. are in many cases preferable. As the temperature approaches about 120° F., less desirable polymers are obtained. Above this temperature and especially above 130° F. the product from butadiene is still less suitable for the purpose at hand.

When polymerizing homologues of butadiene, materially different temperatures, than for butadiene, may be found preferable.

While the invention is generally applied to butadiene, which is normally gaseous, it may be applied to homologues thereof, which are normally liquid, such as isoprene, piperylenes, 2,3-dimethylbutadiene, 2-chlorobutadiene, etc. In such case the diolefin may be introduced to the reaction zone either as such, in the liquid or gaseous form, or in the form of a previously prepared solution in the solvent or diluent employed.

For the preparation of the alcohol-boron fluoride addition compounds used as catalytic agents in this process, a convenient procedure consists in the introduction of boron fluoride into substantially anhydrous monohydric aliphatic alcohols. By maintaining the reaction temperature below 100° F. and preferably between about 65° and about 85° F., the reaction in most instances with the lower primary alcohols appears to follow the equation previously indicated. Certain commercially available alcohols which are mixtures of isomers, such as the amyl or octyl alcohols, may absorb from one to two mols of boron fluoride per mol of alcohol (combination of one-half to one mol of alcohol with one mol of $BF_3$). These boron fluoride alcoholates are stable compounds at the polymerization temperatures employed in this process. Thus, the liquid catalyst used in accordance with the present invention is formed by the reaction of from about one-half to about two moles of $BF_3$ with one mol of alcohol.

The production of valuable polymers from butadiene may be carried out by bringing together in a suitable liquid paraffin hydrocarbon reaction medium and diluent, the alcohol-boron fluoride catalyst and relatively small and closely controlled amounts of butadiene hydrocarbon as the substantially pure compound or in mixtures containing a major proportion of the diolefin. In such instances, the polymers formed may be wholly or partially soluble in the paraffin hydrocarbon medium. Any hydrocarbon-insoluble polymers, of course, separate from the solution and may be removed by suitable means. Additional amounts of butadiene are added as the polymerization proceeds to maintain optimum concentrations, and the polymer solution may be treated by means such as fractionation or the like to recover the hydrocarbon-soluble material.

Continuous polymerization is especially feasible where reaction conditions favor the formation of hydrocarbon-soluble butadiene polymers. A major problem in conducting polymerization reactions on a commercial scale is the necessity of removing the heat of reaction. The present invention provides a method for conducting such reactions efficiently and with good temperature control.

In the accompanying drawing, 1 represents a storage tank containing a liquid hydrocarbon mixture containing a major proportion of butadiene from which said mixture is withdrawn through line 3 and introduced into the bottom of the reaction chamber 6. A suitable hydrocarbon solvent and/or diluent is stored in tank 2 from which it is pumped by pump 5 through line 4 into the reaction chamber. The reaction chamber 6 is operated with the liquid level maintained at the height of line 8. During operation, liquid catalyst (described above) is withdrawn from storage tank 10 through line 11 and is introduced into the top of the reaction chamber where it passes downward through the ascending stream of the solution of butadiene and polymer in the paraffin hydrocarbon solvent. Intimate contact between the catalyst and hydrocarbon liquid is maintained by the stirring shaft 7 or its equivalent. Catalyst is removed at the bottom by means of line 12 and pump 13 and returned to storage 10. Solvent containing the polymerized butadiene is removed continuously through line 8 and recycled by means of line 9 and pump 5. After a predetermined viscosity of the polymer solution and/or suspension has been reached, the product is partially diverted via line 10A into a separator 10B while the remainder is recycled with added make-up solvent being added from 2. Entrained catalyst is separated by gravity in 10B and returned to the catalyst recycle pump 13 via line 20. The supernatant layer of polymer solution passes from separating zone 10B via line 10C to zone 14 where last traces of catalyst are removed from the product stream by means of a dilute alkaline solution. The alkali-washed product is subsequently dehydrated by conventional methods in 15. The dry product is fed into polymer separator 16 where the solvent is removed by distillation with the vapors going overhead into condenser 21, where they are condensed to liquid form and thence via line 17 to solvent storage 2. The finished polymer is withdrawn from the separator 16 through line 18. Heat of polymerization is removed by means of a selected cooling fluid circulated through the cooling jacket 19. A vent line 23 is provided with an automatic pressure release valve 22 in order to maintain substantially atmospheric pressure within the polymerization zone.

Where batch operation is employed the preferred method of contacting the butadiene concentrate and liquid catalyst involves the suspension of said catalyst in a diluent such as selected paraffin hydrocarbons. Agitation of the diluent is essential in order to maintain the catalyst in a finely divided state (as for example to maintain the reaction mixture in the form of an emulsion in which the catalyst and diluent are continuously in intimate and extended interfacial contact for rapid reaction). Butadiene, ordinarily in the gaseous state, is introduced beneath the liquid surface and this gradual addition is continued without exceeding the desirable concentration of the unreacted diolefin until a product of desired characteristics has been produced. The addition of butadiene is so regulated that substantially complete reaction takes place. Temperature control is maintained by means of internal cooling coils. Batch operation may be advantageous where polymers of very high molecular weight are formed. Such polymers are not soluble in the aliphatic paraffin hydrocarbons which are the preferred reaction solvents and/or diluents.

In polymerizing butadiene by either batch or continuous operation, we have found that it is exceedingly important to maintain the concentration of butadiene at a low level at all times in order to produce high molecular weight polymers with desirable characteristics. In our process which employs large volumes of unreactive diluent, the concentration of butadiene is always maintained below about 10 per cent and preferably below 2 percent by volume of the diluent phase. The liquid volume ratio of substantially non-reactive material to butadiene in the polymerization mixture thus ranges from 9:1 to 49:1 or more with best results being obtained with the more dilute butadiene solutions.

While the polymerization of butadiene according to the present invention is catalyzed by the liquid addition compounds of boron fluoride with aliphatic monohydric alcohols, said addition compounds are not to be considered entirely equivalent in their catalytic properties. The choice of a catalyst for the process thus may be dependent on the type of polymeric product desired, and on other economic considerations such as the cost and yield of catalyst from a specific alcohol.

The yield of catalyst is ordinarily best with primary aliphatic alcohols, and we often prefer to use primary aliphatic alcohols of 1 to 4 carbon atoms because of the relative purity and availability of alcohols in this group and the good yield of catalyst. With amyl and higher alcohols, the yield of catalyst decreases somewhat with the increasing number of carbon atoms and the complexity of the alcohol mixtures. In the case of technical octyl alcohol, which is a mixture of several octyl alcohols, the catalyst yield is about 75 volume per cent of the alcohol used.

When the nature of the polymer product from the various catalysts is considered, exclusive of the effect of polymerization temperatures, the low molecular weight alcohol catalysts appear to favor the formation of liquid polymers while the catalyst produced from high molecular weight alcohols seem to favor the production of a greater proportion of solid, hydrocarbon-insoluble butadiene polymers. However, regardless of the catalyst used, only minor variations in activity and reaction rate have been observed, and we do not, therefore, limit ourselves to any particular theory or mode of operation with any specific catalyst composition except as defined and limited by the scope of the present disclosure.

We have noted further that the process of the present invention using our catalysts yields a product substantially different from those obtained with boron fluoride alone, other conditions being the same. For example, when the polymerization of butadiene in a hydrocarbon diluent completely saturated with free boron fluoride was attempted, the rate of polymerization was of a distinctly lower order than with the alcohol addition compounds disclosed herein. This resulted in a poor yield of polymer with a great proportion of the butadiene passing through the reaction zone unchanged. The polymer produced under these conditions possessed generally undesirable characteristics when compared to products obtained by polymerization in accordance with the present invention with an alcohol-boron fluoride addition compound catalysts. These facts indicate the novel activity and characteristics of the alcohol-boron fluoride compounds as compared to other polymerization catalysts including boron fluoride alone.

The preferred diluents and/or polymer solvents for this process are the aliphatic paraffin hydrocarbons which are substantially inert under the polymerizing conditions and which are easily separable from the products of polymerization. These materials may be used in more or less pure form or in mixtures such as may be obtained by the fractionation of natural gasoline or light petroleum fractions of predominantly paraffinic nature. Normal pentane, because of its availability and volatility, is often preferred and other paraffins including those of from four to eight or more carbon atoms may be used. The especial advantage of the lower-boiling members is the ease with which they may be flashed or vaporized away from the high-boiling polymers at moderate temperatures. However, the $C_7$, $C_8$, and higher paraffins may be employed with good results.

From the subsequent examples it will be noted that the general procedure of our process affords a maximum of flexibility with respect to operating conditions which influence the nature of the product. Furthermore, variations in temperature and butadiene concentration along with the choice of catalyst result in polymeric products having substantially different properties and uses. For example, polymerization of butadiene at 80° F. in the presence of 50 to 100 or more parts of n-pentane containing a small proportion of methanol-boron fluoride catalyst produces a viscous transparent polymer which when exposed to air in thin films dries to tack-free, non-brittle resins. Polymerization of 30–40° F. produces both liquid and solid polymers, the latter being insoluble in aliphatic hydrocarbons. These solid products are white resilient polymers which disperse and swell in benzene to form extremely viscous solutions and/or suspensions. On the other hand octanol-boron fluoride catalyst favors the formation of a greater proportion of pentane-insoluble polymer at both temperature levels mentioned above.

The amount of catalyst added to any reaction mixture will depend on the total volume of the hydrocarbon polymerization medium and the efficiency of the means for suspending or dispersing the catalyst throughout the hydrocarbon liquid. It is desirable to have complete and uniform dispersion of catalyst in more or less finely divided condition to provide smooth polymerization. This effect may be accomplished with as little as about one percent by volume of catalyst in the reaction liquid although higher concentrations may be used if desired, particularly in a continuous type polymerization wherein the catalyst is recycled after separation from the hydrocarbon phase.

Other details relating to the procedure and the advantages of this invention will be described in the following examples which are merely offered by ways of illustration and without limiting the invention.

Example 1

A hydrocarbon gas containing 94 per cent butadiene was polymerized under the influence of a methanol-boron fluoride catalyst in the presence of a large volume of isopentane as the paraffin hydrocarbon diluent. The catalyst was prepared by saturating absolute methyl alcohol with boron fluoride at a temperature maintained below 85° F. followed by fractional distillation. The catalyst fraction employed, distilled between 255–275° F. and presumably consisted of a mixture of mono- and dialcoholates of boron fluoride. To 250 cc. of isopentane, 2 cc. of the catalyst was added and maintained in a finely divided state by means of mechanical agitation. 140 g. of gaseous butadiene was introduced beneath the surface of the suspension of catalyst in isopentane at an average rate of 75–80 cc. per minute and the reaction temperature was maintained between 40° and 50° F. Both hydrocarbon soluble and insoluble polymerization products were recovered at the conclusion of the reaction. The catalyst was removed from the reaction products by washing with dilute caustic. After drying the isopentane-polymer solution over solid sodium hydroxide, the solvent was removed by distillation. The resultant hydrocarbon-soluble polymer was a pale yellow, extremely viscous liquid. The hydrocarbon-insoluble polymer was a white resilient solid. A total of 140 g. of butadiene yielded approximately 100 g. of liquid and 40 g. of solid polymer.

Example 2

The polymerization of a hydrocarbon gas of 99 per cent butadiene concentration was effected at a temperature held substantially at 65° F. in the presence of n-pentane and a boron fluoride-methanol catalyst. A catalyst fraction boiling between 275° and 285° F. and consisting essentially of the dialcoholate of boron fluoride was used. To 250 cc. of n-pentane, 2 cc. of the methanol-boron fluoride addition compound was added and maintained in a state of suspension by means of mechanical agitation. Gaseous butadiene was introduced into the reaction mixture at an average rate of 75–80 cc. per minute. At the conclusion of the reaction, both solid and liquid polymerization products were recovered as described in Example 1. In this instance the ratio of solid to liquid polymer was considerably less than in the preceding example and modification of physical properties was also apparent. A total of 125 g. of butadiene was polymerized to yield approximately 25 g. of solid and 100 g. of liquid product. The pentane-insoluble polymer was a white resilient solid somewhat tougher than the product produced at the lower temperature in isopentane. The soluble product was a transparent viscous liquid.

Example 3

The polymerization of a hydrocarbon gas of 94 per cent butadiene concentration was carried out substantially as described in Example 2 with the exception of an increase in reaction temperature to 80° F. A very viscous liquid polymer was produced with only a negligible quantity of solid material.

Example 4

The polymerization of a hydrocarbon gas containing 90 per cent butadiene was carried out at a temperature maintained between 80° and 85° F. in the presence of n-pentane and a boron fluoride-methanol catalyst. The catalyst in this instance was the mono-alcoholate of boron fluoride prepared by absorbing 100 mol per cent of boron fluoride in absolute methyl alcohol. A countercurrent principle was utilized with n-pentane and gaseous butadiene being fed separately into the bottom of a reaction column. The flow of butadiene was so regulated that a one per cent concentration of unreacted butadiene was maintained in the n-pentane. The catalyst was fed into the top of the column and passed downward through the ascending pentane-butadiene solution. Intimate contact was maintained in the reaction column by means of a stirring shaft. The catalyst was recovered at the bottom of the column and recycled for reuse while the pentane polymer solution exiting from the top of the column was recycled with the continuous addition of butadiene. After the concentration of polymer in the recycled pentane polymer solution reached a value of 5%, a portion of the effluent solution was bled off from the recirculating system at a rate such as to maintain this value, and passed to purification and recovery steps, in the manner shown in the drawing. A clear viscous liquid polymer was produced by this procedure.

Example 5

Commercial butadiene of 94 per cent purity was polymerized in the presence of n-pentane diluent and a n-butanol boron fluoride addition compound as the catalyst. The catalyst was prepared by absorbing one mol of boron fluoride in one mol of n-butyl alcohol. The polymerization was carried out by adding 5 cc. of catalyst to 250 cc. of n-pentane and introducing the gaseous butadiene at an average rate of 85 cc. per minute with mechanical agitation. On terminating the reaction, the polymer was treated with dilute alkali to remove traces of entrained catalyst. Substantially quantitative polymerization of the butadiene was realized and the weight ratio of pentane-soluble to pentane-insoluble polymer was 1:2. The pentane-soluble polymer was an extremely viscous water-white liquid with the properties of a drying oil. The pentane-insoluble product was a white, soft resilient solid.

Example 6

Commercial butadiene of 94 per cent purity was polymerized in n-pentane in the presence of a catalyst prepared from technical octyl alcohol and boron fluoride. The catalyst was prepared by passing boron fluoride into the octyl alcohol at temperatures maintained between 25° and 70° F. until 1.3 mols of boron fluoride had been absorbed per mol of alcohol. Side reactions took place with the result that only a 75 per cent yield of catalyst was realized. The polymerization was effected at temperatures maintained between 75° and 80° F. in 250 cc. of n-pentane, using 5 cc. of catalyst and a butadiene flow rate of 85 cc. per minute. Both pentane-soluble and insoluble polymers were obtained in substantially equal quantities. The soluble polymer was a viscous mucilaginous liquid while the insoluble polymer was recovered in the form of soft crumbs which could be kneaded into a non-sticky resilient mass.

The choice of the inert hydrocarbon diluent will vary with the boiling point of the diolefin being polymerized and the nature of the polymers. Therefore, all diluents described herein are not equally satisfactory for each diolefin. It will be understood that the various aliphatic conjugated diolefins are not equivalents in all aspects of the present invention. Experience in synthetic rubber production has emphasized the differences in behavior of butadiene and the higher diolefins in polymerization and in the products obtained. Thus, the proportion of the butadiene polymer soluble in the reaction diluent may be controlled by the herein disclosed reaction controls including temperature. Temperatures for controlling the ratio of soluble to insoluble polymers of $C_5$ and higher aliphatic conjugated diolefins may be materially different.

It is to be understood that the invention is not limited to the specific examples which have been offered merely as illustrations and that modifications may be made within the scope of the claims without departing from the spirit of the invention.

We claim:

1. A process for the polymerization of an aliphatic conjugated diolefin which comprises contacting said diolefin with a liquid addition compound of boron fluoride and an aliphatic monohydric alcohol in the presence of a large volume of a paraffin hydrocarbon as an inert diluent, and maintaining the concentration of unreacted diolefin in the reaction zone at less than about 10 volume per cent of the diluent phase throughout the reaction.

2. A process for the polymerization of an aliphatic conjugated diolefin which comprises contacting said diolefin with a liquid addition compound of boron fluoride and an aliphatic monohydric alcohol in the presence of a large volume of a paraffin hydrocarbon as an inert diluent, and maintaining the concentration of unreacted diolefin in the reaction zone at less than about 2 volume per cent of the diluent phase throughout the reaction.

3. A process for the polymerization of an aliphatic conjugated diolefin which comprises contacting said diolefin with a liquid addition compound of boron fluoride and an aliphatic monohydric alcohol in the presence of a large volume of an inert diluent which is a paraffin hydrocarbon of from four to eight carbon atoms.

4. A process for the polymerization of butadiene which comprises contacting said butadiene with a liquid addition compound of boron fluoride and an aliphatic monohydric alcohol in the presence of a large volume of an inert diluent which is pentane.

5. The continuous process of polymerizing an aliphatic conjugated diolefin which comprises establishing two endless flowing circuits of a liquid addition compound of boron fluoride and an aliphatic monohydric alcohol on the one hand and a solution of said diolefin in a paraffin hydrocarbon as an inert solvent on the other hand, said circuits overlapping to form a polymerization zone in which the flow is countercurrent and in which said compound is descending and said solution ascending, continuously introducing unreacted diolefin to the bottom of said zone, continuously withdrawing a portion of the solvent stream issuing from the top of said zone, and recovering polymer therefrom.

6. The process of polymerizing butadiene which comprises flowing a solution thereof in a large volume of an inert paraffinic solvent upwardly in a polymerization column, flowing a liquid catalyst consisting essentially of an addition product of boron fluoride and an aliphatic monohydric alcohol downwardly in said column, vigorously agitating the material in said column to promote intimate contact and rapid reaction, separating catalyst at the bottom of said column and recycling to the top thereof, withdrawing solvent phase from the top of said column and recycling a portion of said solvent phase to the bottom of said column, introducing fresh unreacted butadiene to the bottom of said column, introducing solvent to the bottom of said column, withdrawing the balance of said withdrawn solvent phase from the system at a rate equivalent to that at which said fresh butadiene is introduced, recovering butadiene polymer from said balance of said solvent phase, maintaining the temperature in said column between about 30° F. and about 120° F. and the pressure at substantially atmospheric, and maintaining the concentration of unreacted butadiene throughout the reaction zone at below about 10 volume per cent of the solvent phase.

7. A process for the polymerization of butadiene which comprises contacting same in the presence of a major proportion of a substantially inert paraffin hydrocarbon diluent with a polymerization catalyst consisting of a liquid addition compound of boron fluoride and an aliphatic monohydric alcohol, while maintaining the reaction temperature within the range of about 30° F. to about 120° F. at substantially atmospheric pressure, and maintaining the butadiene concentration below about 10 volume per cent of the hydrocarbon diluent phase.

8. A process for the production of viscous liquid polymers of high molecular weight from butadiene which comprises contacting said butadiene in the presence of sufficient paraffinic hydrocarbon diluent to produce a butadiene concentration in the range of about 0.5 to about 2 volume per cent of the diluent phase with a catalyst consisting of a liquid addition compound of boron fluoride and methanol at temperatures of about 80 to about 100° F.

9. A process for the simultaneous production of hydrocarbon soluble and insoluble polymers from butadiene which comprises contacting butadiene in the presence of sufficient paraffinic hydrocarbon diluent to produce butadiene concentrations not exceeding substantially two volume per cent, at temperatures in the range of 50° to 80° F. with a catalyst consisting of an addition compound of boron fluoride and an aliphatic monohydric alcohol.

10. A process for the production of high-boiling polymers of butadiene which comprises continuously introducing butadiene into a stream of a liquid paraffinic hydrocarbon solvent flowing through a reaction zone counter-current to a stream of a polymerization catalyst consisting of a liquid addition compound of boron fluoride and an aliphatic monohydric alcohol whereby butadiene polymers are produced in the hydrocarbon solvent, maintaining the temperature in the reaction zone in the range of 80° to 100° F., and recycling both catalyst and polymer solutions to the reaction zone, continuously adding fresh solvent while withdrawing a corresponding amount of polymer solution from the system, and distilling said withdrawn portion of polymer solution after removal of traces of catalyst therefrom to recover butadiene polymers and solvent.

11. A process for the polymerization of butadiene which comprises contacting butadiene with a liquid addition compound of boron fluoride and an aliphatic monohydric alcohol in the presence of a paraffin hydrocarbon diluent at a temperature within the range of about 80° F. to about 100° F. and at substantially atmospheric pressure, and under conditions such that the concentration of unreacted butadiene in the reaction zone is less than about 10 per cent by volume of the hydrocarbon diluent phase.

12. A process for the polymerization of butadiene which comprises contacting butadiene with a liquid addition compound of boron fluoride and an aliphatic monohydric alcohol containing from about 0.5 to about 1 mol of boron fluoride per mol of alcohol, in the presence of a paraffin hydrocarbon diluent at a temperature within the range of 30 to 120° F. and at substantially atmospheric pressure, and under conditions such that the concentration of unreacted butadiene in the reaction zone is less than about 10 per cent by volume of the hydrocarbon diluent phase.

13. A process for the polymerization of an aliphatic conjugated diolefin which comprises contacting said diolefin with a liquid addition compound of boron fluoride and an aliphatic monohydric alcohol in the presence of a paraffin hydrocarbon diluent at a temperature within the range of about 30° F. to about 120° F. and at substantially atmospheric pressure, and under conditions such that the concentration of unreacted diolefin in the reaction zone is less than about 10 per cent by volume of the hydrocarbon diluent phase.

14. A process for the polymerization of butadiene which comprises contacting butadiene with a liquid addition compound of boron fluoride and an aliphatic monohydric alcohol in the presence of a paraffin hydrocarbon diluent, and maintaining the concentration of unreacted butadiene in the reaction zone at less than 10 per cent by volume of the hydrocarbon diluent phase.

15. A process for the polymerization of butadiene which comprises contacting butadiene with a liquid addition compound of boron fluoride with an aliphatic monohydric alcohol in the presence of a paraffin hydrocarbon of four to eight carbon atoms per molecule as diluent under conditions such that the concentration of unreacted butadiene in the reaction zone is less than about 10 per cent by volume of the hydrocarbon diluent phase.

16. The process of claim 15 in which the paraffin hydrocarbon is pentane.

WALTER A. SCHULZE.
WILLIAM N. AXE.